UNITED STATES PATENT OFFICE.

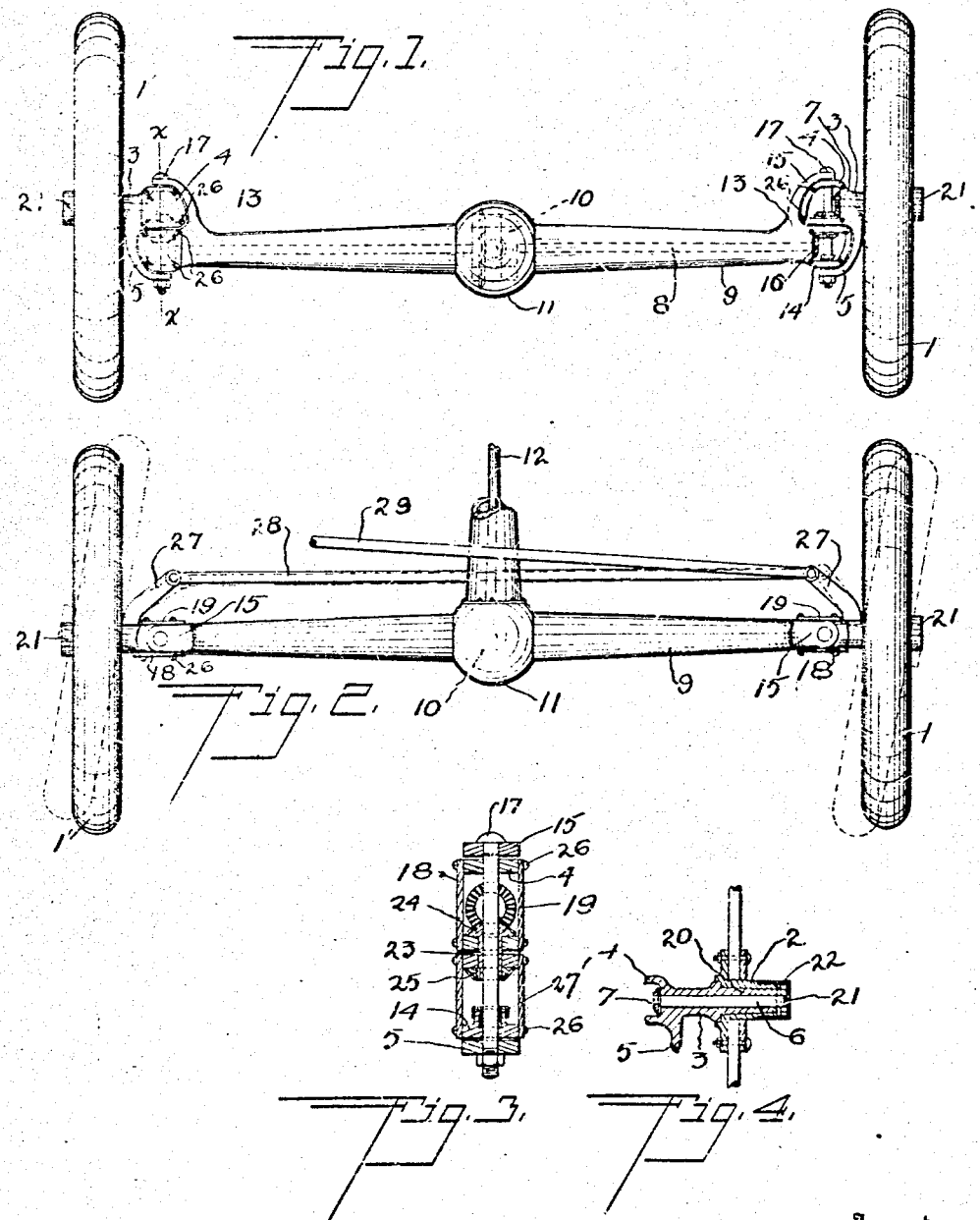

CHARLES C. BETTENHAUSEN, OF PRINCETON, NEBRASKA.

AUTOMOBILE DRIVING-GEAR.

974,773.  Specification of Letters Patent.  Patented Nov. 8, 1910.

Application filed July 25, 1910. Serial No. 573,746.

*To all whom it may concern:*

Be it known that I, CHARLES C. BETTENHAUSEN, of Princeton, in the county of Lancaster and State of Nebraska, have invented certain new and useful Improvements in Automobile Driving-Gear, which are described in the following specification and are illustrated by the accompanying drawings.

My invention relates to mechanism for driving the forward wheels of automobiles positively.

It is one of the objects of the invention to utilize in mechanism of this kind an axle of that type which is commonly known as a dependent or drop axle, and thereby to attain all the special advantages which result from the use of a forward axle of that kind.

It is another object of the invention to simplify the construction of driving gear of this type.

It is another object of the invention to use at each end of the driven forward axle of a motor vehicle a gearing whose intermediate or idle member, being constructed with oppositely directed faces, shall have the shaft of that member supported both in the middle and also at each end of that shaft.

It is another object of the invention to inclose the working members of the knuckle gearing in separate oil chambers, which are pivoted one above the other by the shaft of such intermediate member.

These several objects I accomplish simultaneously.

The best manner in which I have contemplated applying the principles of the invention, are shown in said drawings; in which—

Figure 1 is a rear elevation of the forward truck of an automobile, constructed in accordance with those principles. Fig. 2 is a plan view of the same. Fig. 3 is an enlarged detail in vertical cross-section on line *x—x* of Fig. 1. Fig. 4 is an axial vertical section through the hub of one of the traction wheels.

In these views the forward wheels of the vehicle are denoted by the numerals 1 and 1'. Each of these wheels has a hub 2, turning upon the bearing sleeve 20, and provided with a screw cap 21. Sleeve 20 is the shank of a yoke 3, which comprises a casing 4 and a dependent bracket 5. Within sleeve 20 runs a stub axle 6, which carries at its inner end a bevel gear 7, located in said casing 4, and engages at its outer end the outer end of hub 2 by a pin 22 or by other convenient means. The front axle, being shown by dotted lines, in Fig. 1, is denoted by the numeral 8. It is inclosed in sleeve 9, and is driven by differential gearing 10. The latter is located in the usual manner in a casing or chamber 11, which is the enlarged middle part of sleeve 9. The same differential gearing is driven by rod 12, connecting with an engine which is not shown in the drawings. Sleeve 9 carries at each end a yoke 13, which is similar in construction to yoke 3, and comprises a casing 14 and an upward reaching arm 15. Each of said casings 4 and 14 is closed, so as to exclude dirt and hold lubricating oil, by means of anterior and posterior hoods, or covers, 18 and 19, which are fastened to the described yokes by screws 26 or the like, as shown in Fig. 2. The bottom of casing 14 is provided with suitable packing and a packing valve 27', about pin 17, as shown in Fig. 3, to prevent leakage of oil from that casing. Within casing 14 is a bevel gear 16, which is carried at the end of axle 8. Said yokes 3 and 13 are held together by a vertical shaft or pivotal pin 17, which passes through the upper and lower walls of said casings 4 and 14, and through the terminal portions of said brackets 5 and 15. A sleeve 23, rotates on the middle of pin 17, and carries on its opposite ends two bevel gears, 24 and 25, which are located in said casings 4 and 14 respectively, and in mesh with said gears 7 and 8 respectively. Two arms 27, projecting forward from yokes 3, are connected by a link 28 and operated by a rod 29 in the usual manner to turn the vehicle wheels to inclined positions, indicated by broken lines in Fig. 2.

Such being the construction and operation of my invention, I claim—

1. A rotatory axle, which is driven by differential gearing, and is provided with terminal beveled gear wheels; a sleeve thereon, which carries at each end an upwardly extending bracket and a closed casing for one of said terminal beveled gear wheels; a pair of traction wheels, having rotatory stub axles, which are fastened to the hubs of said traction wheels, and are provided with bevel gears; a nonrotatory sleeve which rides between the hub and stub axle of each traction wheel, and carries a downwardly extending bracket and a closed casing for one of said bevel gears; and a vertical pivot pin, which passes through both of said brackets and both of said casings; in combination with a gear sleeve, which pivots said gear casings together, rotates on said pivot pin, and is provided with terminal gears, meshing with said beveled gear wheels and bevel gears.

2. In driving gear for motor vehicles, an axle which is provided with terminal beveled gear wheels, and is formed in two sections, rotatable out of unison; means for transmitting motion differentially to said axle; a bearing sleeve, which surrounds said axle, and is provided at each end with an upwardly reaching bracket and with a closed casing for one of said terminal beveled gear wheels; a pair of traction wheels, having rotatory stub axles, which are fastened rigidly to the hubs of said traction wheels respectively, and are provided with terminal beveled gears respectively; nonrotatory bearing sleeves, which are located between the hubs and stub axles of said traction wheels, and which carry each a downwardly extending bracket and a closed gear casing; a vertical pivot pin, upon which said gear casings are mounted, one above the other; and a gear sleeve, which pivots said gear casings together, rotates on said pin, and is provided with terminal gears, located in said casings respectively, and meshing with said gear wheels; in combination with means for turning, relatively to each other, the parts which are so pivoted together.

In testimony whereof I hereunto subscribe my name in the presence of two witnesses.

CHARLES C. BETTENHAUSEN.

Witnesses:
  WM. K. LANGHEIM, Jr.,
  KESSLER CULP.